United States Patent [19]

Soane

[11] Patent Number: 5,278,243

[45] Date of Patent: Jan. 11, 1994

[54] HIGH IMPACT RESISTANT MACROMOLECULAR NETWORKS

[75] Inventor: David S. Soane, Piedmont, Calif.

[73] Assignee: Soane Technologies, Inc., Hayward, Calif.

[21] Appl. No.: 820,271

[22] Filed: Jan. 14, 1992

[51] Int. Cl.$^5$ .................................. C08F 275/00
[52] U.S. Cl. ............................. 525/288; 526/279
[58] Field of Search .................. 526/279; 525/288

[56] References Cited

U.S. PATENT DOCUMENTS

| | | | |
|---|---|---|---|
| 3,635,756 | 1/1972 | Shepherd et al. | 117/124 D |
| 3,673,055 | 6/1972 | Shield | 161/183 |
| 3,953,652 | 4/1976 | Addiss, Jr. et al. | 428/412 |
| 3,971,872 | 7/1976 | LeBoeuf | 428/412 |
| 3,991,234 | 11/1976 | Chang et al. | 427/164 |
| 4,052,520 | 10/1977 | Chang et al. | 427/164 |
| 4,073,967 | 2/1978 | Sandvig | 427/44 |
| 4,079,160 | 3/1978 | Philipson | 428/217 |
| 4,107,235 | 8/1978 | DeWitt | 260/876 R |
| 4,127,697 | 11/1978 | Laurin | 428/412 |
| 4,164,602 | 8/1979 | Fabel | 428/334 |
| 4,173,490 | 11/1979 | Rotenberg et al. | 106/287.14 |
| 4,191,804 | 3/1980 | Weber | 428/409 |
| 4,199,421 | 4/1980 | Kamada et al. | 204/159.02 |
| 4,211,823 | 7/1980 | Suzuki et al. | 428/412 |
| 4,228,256 | 10/1980 | Schmitt | 525/302 |
| 4,243,721 | 1/1981 | Baney et al. | 428/412 |
| 4,273,809 | 6/1981 | LaLiberte et al. | 427/155 |
| 4,291,098 | 9/1981 | Tanaka et al. | 428/412 |
| 4,294,950 | 10/1981 | Kato | 528/14 |
| 4,298,655 | 11/1981 | Kray | 428/412 |
| 4,299,886 | 11/1981 | Soejima et al. | 428/412 |
| 4,308,315 | 12/1981 | Frye | 428/331 |
| 4,311,763 | 1/1982 | Conroy | 428/412 |
| 4,324,839 | 4/1982 | Frye | 428/412 |
| 4,343,857 | 8/1982 | Uram, Jr. | 428/336 |
| 4,348,462 | 9/1982 | Chung | 428/412 |
| 4,351,881 | 9/1982 | Kanada et al. | 428/412 |
| 4,367,262 | 1/1982 | Vaughn, Jr. | 428/331 |
| 4,368,235 | 1/1983 | Vaughn, Jr. | 428/412 |
| 4,368,236 | 1/1983 | Frye | 428/412 |
| 4,373,076 | 2/1983 | Tarumi et al. | 526/261 |
| 4,435,450 | 3/1984 | Coleman | 427/385.5 |
| 4,435,476 | 3/1984 | Phillips et al. | 428/412 |
| 4,456,647 | 6/1984 | Schönfelder et al. | 428/216 |
| 4,478,876 | 10/1984 | Chung | 427/54.1 |
| 4,492,733 | 1/1985 | Phillips et al. | 428/412 |
| 4,503,126 | 3/1985 | Phillips et al. | 428/412 |

(List continued on next page.)

FOREIGN PATENT DOCUMENTS

PCT/US90/-
02377 11/1982 PCT Int'l Appl. .
PCT/US90/-
02000 3/1986 PCT Int'l Appl. .
PCT/US90/-
02378 4/1987 PCT Int'l Appl. .

Primary Examiner—Joseph L. Schofer
Assistant Examiner—David Wu
Attorney, Agent, or Firm—Kilpatrick & Cody

[57] ABSTRACT

A high impact resistant macromolecular network is disclosed that includes a basic, stiff framework interconnected by soft, shock-absorbing multiple bridges to cushion thermoelastic stresses. The network is prepared by polymerizing or copolymerizing with vigorous agitation, an unsaturated hard material (characterized in that when homopolymerized, it forms a polymeric material that is below its glass transition temperature at ambient temperature), in the presence of a soft moiety selected from the group consisting of vinyl substituted siloxane, allyl substituted siloxane, acrylate terminated or substituted siloxane, and unsaturated hydrocarbon polymer, to form a partially polymerized mixture in which the soft moiety is homogeneously distributed; pouring the partially polymerized mixture into a mold, and then completing the polymerization without agitation. The final products are dimensionally exact and stable, transparent, easily machinable and resilient, and can be designed to have good optical properties.

9 Claims, 2 Drawing Sheets

U.S. PATENT DOCUMENTS

| | | | |
|---|---|---|---|
| 4,525,421 | 6/1985 | Kubota et al. | 428/412 |
| 4,533,595 | 8/1985 | Olson et al. | 428/336 |
| 4,540,634 | 9/1985 | Ashlock et al. | 428/451 |
| 4,544,572 | 10/1985 | Sandvig et al. | 427/44 |
| 4,547,397 | 10/1985 | Burzynski et al. | 427/164 |
| 4,550,059 | 10/1985 | Dalton | 428/409 |
| 4,551,361 | 11/1985 | Burzynski et al. | 427/164 |
| 4,737,588 | 4/1988 | Falcetta et al. | 526/279 |
| 4,762,730 | 8/1988 | Enke et al. | 427/40 |
| 4,769,431 | 9/1988 | Ratkowski | 526/279 |
| 4,774,035 | 9/1988 | Carmelite et al. | 264/1.4 |
| 4,778,721 | 1/1988 | Sliemers et al. | 428/336 |
| 4,816,333 | 3/1989 | Lange et al. | 428/331 |
| 4,826,936 | 5/1989 | Ellis | 526/258 |
| 4,830,481 | 5/1989 | Futhey et al. | 351/161 |
| 4,837,289 | 6/1989 | Mueller et al. | 526/279 |
| 4,857,606 | 8/1989 | Su et al. | 525/455 |
| 4,904,525 | 2/1990 | Taniguchi et al. | 428/328 |
| 4,923,906 | 5/1990 | Mueller et al. | 526/279 |
| 4,936,666 | 6/1990 | Futhey | 350/452 |
| 4,977,229 | 12/1990 | Culberson et al. | 528/26 |
| 5,013,608 | 5/1991 | Guest et al. | 428/436 |
| 5,023,305 | 6/1991 | Onozuka et al. | 526/194 |
| 5,051,308 | 9/1991 | Reed et al. | 428/412 |
| 5,061,336 | 10/1991 | Soane | 156/245 |
| 5,063,112 | 11/1991 | Gross et al. | 428/412 |
| 5,071,531 | 12/1991 | Soane | 204/182.8 |
| 5,076,684 | 12/1991 | Simpson et al. | 351/168 |
| 5,093,152 | 3/1992 | Bonet et al. | 427/40 |
| 5,102,695 | 4/1992 | Guest et al. | 427/164 |
| 5,116,665 | 5/1992 | Gauthier et al. | 428/216 |

HIGH IMPACT RESISTANT MACROMOLECULAR NETWORKS

This invention is in the area of polymeric networks that have high impact resistance, and optionally, optical transparency.

Materials with high impact resistance (shock and shatter resistance) are useful in a variety of applications, such as optical materials, including lenses, as machine and equipment parts, and as glass substitutes, for example, in windows.

There has recently been an extensive effort to develop new optical materials. It is generally difficult to provide optical materials that are well suited for precision parts and lenses because the materials must satisfy a number of stringent requirements, including high impact resistance, transparency, adequate refractive index, appropriate rigidity and dimensional stability, machinability, ease of fabrication and replication, and abrasion resistance. Glass is a commonly employed optical material meeting most of these requirements. However, glass is weak in impact resistance. Tempered glass provides improved shock and shatter resistance, but fails to totally eliminate the problem.

Optical-grade plastics have improved fracture resistance over glass, but generally have a lower refractive index, abrasion resistance, and dimensional and thermal stability than glass. Further, however, while the shatter (fracture) resistance of optical-grade plastics is generally better than glass, they are often still insufficient for many applications. Stiff plastics have a pronounced tendency to shatter. Crosslinked networks comprising rigid monomers exhibit comparably high glass transition temperatures. These polymers are usually brittle, resembling glass under sudden impact In addition, typical homopolymers and random copolymers exhibit an inverse relationship between stiffness (thus machinability) and shock-resistance.

A commonly used rigid, transparent, polymer is polymethylmethacrylate, often sold under the names Plexiglass or Lucite Polymethylmethacrylate has excellent optical properties, yet suffers from the distinct disadvantage that it shatters on high impact. Optical grade polycarbonates (often sold under the name Lexan), epoxies, polyacrylates, and other vinyl polymers such as polyvinyl chloride and polystyrene also similarly have comparatively low impact resistance. The polymers can be filled with rubbery particles or copolymerized with rubber-modified cores. However, such treatment steps lead to inclusions that scatter light, and the final parts are opaque.

Optical glass and plastic materials are often used in ophthalmic lenses. A wide variety of polymers that include methyl methacrylate or other "hard" monomers (i.e., monomers that form hard, rigid materials) have been used to provide hard contact lenses. Hard contact lenses have the advantage of excellent machinability and optical clarity, yet are typically brittle, and have poor hydrophilic properties and oxygen permeability. The inability of the hard lens to withstand impact allows the lens to shatter, and can cause optical damage if the break occurs in the eye. Polymers and copolymers of hard monomers have also been used as lenses in eyeglasses, including protective eyewear for sporting activities. There is a strong need to provide materials that will withstand high impact for such uses. Hard monomers have also been used in combination with "soft" moieties or monomers (monomers that form soft, pliable materials) in the ophthalmic lens area to increase wettability and decrease rigidity.

Traditional copolymers of hard monomers with soft moieties are described, for example, in U.S. Pat. No. 4,737,558 (a copolymer prepared from siloxane monomers having an aromatic ring and a vinyl functionality), U.S. Pat. No. 4,826,936 (a polymer prepared from unsaturated, multifunctional organosiloxanes and a hardening agent such as methyl methacrylate, hydrophilic monomer wetting agents, and itaconate hydrophilic and hardening agents), U.S. Pat. Nos. 4,837,289 and 4,923,906 (polyvinyl-polysiloxanes), U.S. Pat. No. 4,857,606 (polymer containing a polyoxyalkylene backbone), U.S. Pat. No. 4,977,229 (polymer formed by polymerizing a monomer of the structure G-C(CH$_2$)CH$_2$OCH$_2$CH(OH)CH$_2$O(CH$_2$)$_n$-siloxane, wherein G is an electron withdrawing group), U.S. Pat. No. 5,023,305 (a copolymer of at least one monomer selected from fluorine-containing methacrylates and a siloxane oligomer having a polymerizable functional group at the molecular terminals), and U.S. Pat. No. 4,769,431 (copolymer of 1-20 weight percent of acryloxyalkylsilanol, 1-15% of polyacryloxyalkyl-polysiloxane, 30-75% of a siloxy substituted ester of acrylic or methacrylic acid, 1-35% of an alkyl or cycloalkyl acrylate or methacrylate having from one to twenty carbon atoms, from 1-20% of a polyol diacrylate, and 1-20% of a wetting monomer). All of these materials are designed to be either soft, oxygen permeable, or wettable. The different reactive components are randomly copolymerized, so that their network structures are not well defined.

Recently glass and plastics have been combined to create composite structures for optical uses, in building materials and as optical components. In one such method, a curved glass piece forms the convex side of the lens. It is backed by an in-situ polymerized plastic piece, which is firmly attached to the glass to prevent delamination. However, the mismatched thermal expansion coefficients of the glass and the plastic can lead to significant transient thermoelastic stresses during temperature cycling, causing potential failure of the composite.

In light of the above, there is a strong need for a carefully engineered polymeric structure that has high impact resistance and, optionally, good optical properties.

It is therefore an object of the present invention to provide a polymeric composition of matter that has high impact resistance, while retaining rigidity (dimensional stability), and machinability.

It is another object of the present invention to provide a polymeric material that has high impact resistance that can be used as an optical material.

SUMMARY OF THE INVENTION

A high impact resistant macromolecular network is disclosed that includes a basic, stiff framework interconnected by soft, shock-absorbing multiple bridges to cushion thermoelastic stresses. This macromolecular architecture captures the advantageous features of both hard and soft polymer-forming materials. The network resembles that of rigid bones connected by elastomeric joints Another common household model is toothpicks interconnected by marshmallows. The "marshmallows" are small in dimension, on the order of molecular size, so that they do not scatter light. The final products are dimensionally exact and stable, transparent, easily machinable and resilient. The rigidity of the network can be manipulated by varying the ratio of the stiff framework to the soft bridges. Other physical properties of the network, including hydrophilicity or hydrophobicity, glass transition temperature, and stability against thermal and oxidative degradation, can be manipulated by varying the specific monomers used in the stiff framework and the soft bridge.

After precision in-situ polymerization, the exposed surface of the network can be readily modified by an oxygen plasma (glow discharge) to render the surface more scratch-resistant.

In one embodiment, a polymeric network of polymethylmethacrylate (as the rigid framework) with a small amount of polyvinylmethylsiloxane (as the soft joints) is provided that has superior optical properties and has high resistance to impact. When projected with great velocity against a hard surface such as concrete, the polymeric network recoils a large distance without shattering, chipping, or fracturing.

The macromolecular networks described herein have diverse applications. As an example, they can be used to provide stress-free and defect-free laminates that tightly adhere to glass or other inorganic or organic substrates. Such composite structures offer major advantages. Doublets, triplets and multiplets of plastic and glass laminates can incorporate design flexibilities for integrated optics. Integration reduces the overall spatial requirement of the optical layout. The individual laminate layers can incorporate diffraction as well as refraction features. For example, holograms can be encapsulated by such a polymeric network. Focusing and projection optics can be directly integrated with light sources by way of these polymeric intervening layers. Composites can be designed that exhibit optical transparency, dimensional stability, requisite refractive index, and fracture resistance.

DETAILED DESCRIPTION OF THE INVENTION

As used herein, the term "hard monomer" or "hard material" refers to a monomer or material that polymerizes to form a polymeric material that is below its glass transition temperature at the temperature of use (typically room temperature).

As used herein, the term "soft monomer" or "soft moiety" refers to a monomer or moiety that on polymerization forms a material that is above its glass transition temperature at the temperature of use (typically room temperature).

As used herein, the term "alkyl acrylate" refers to $H_2C=CHCO_2R$, wherein R is a straight, branched, or cyclic alkyl group, preferably $C_1$ to $C_7$.

As used herein, the term "alkyl methacrylate" refers to $H_2C=C(CH_3)CO_2R$ or $H(CH_3)C=CHCO_2R$, wherein R is straight, branched, or cyclic alkyl group, preferably $C_1$ to $C_7$.

As used herein, the term "aryl" refers to phenyl, phenyl substituted with alkyl or halogen, naphthalene or naphthalene substituted with alkyl or halogen, or higher aromatics, either unsubstituted, or substituted with alkyl or halogen.

As used herein, the term "chain polymerization" refers to a polymerization process in which there is a series of reactions each of which consumes a reactive particle and produces another, similar particle. The reactive particles are radicals, anions, or cations. The polymerization of reactive particles occurs without elimination of a small molecule (as in during a typical condensation reaction).

As used herein, the term "monomer" refers to the small reactive molecules that are subsequently joined together to form a polymer.

As used herein, the term "unsaturated hydrocarbon polymer" refers to a polymer that consists essentially of carbon and hydrogen atoms, and that includes alkene (vinyl) groups in the polymer.

As used herein, the term "oligomer" refers to a polymer with 20 or less repeating units.

A macromolecular network is provided that includes stiff members interconnected by soft, elastomeric, multifunctional crosslinking sites. The polymerization is controlled so that the stiff monomers primarily self-polymerize to create members with controlled length that are attached to one another via chemical bonds on the soft crosslinking bridges. The crosslinking bridges (or cores) are randomly dispersed in space, providing the shock-absorbing capacity for the overall rigid yet impact resistant, and optionally, transparent optical, material. Machineability (polish and grind) of the hard plastics is retained, while introducing resilience to the polymer networks.

The macromolecular network is prepared by mixing the soft joint material (the crosslinking substance) with the hard monomers or a hard material and a free radical initiating agent, or other suitable polymerization initiator. It is important that the hard monomers or hard material and the soft joint material are completely miscible, forming a homogeneous solution. The mixture is allowed to partially polymerize into a honey-like or molasses-like consistency (typical viscosity ranging from 100 centipoise to 1000 poise) with vigorous stirring, at which point the material is poured into a mold or cast onto sheets and polymerization completed without agitation. A key aspect of this method is the pre-cast polymerization or "prepolymerization" step, which is employed to ensure true dispersion (molecular level dispersion) of the hard and soft reactants. Since the soft elements are multi-functional, the prepolymerization step effectively ties up the majority of the soft reactants so subsequent segregation of the hard and soft reactants not possible.

Figure 1:
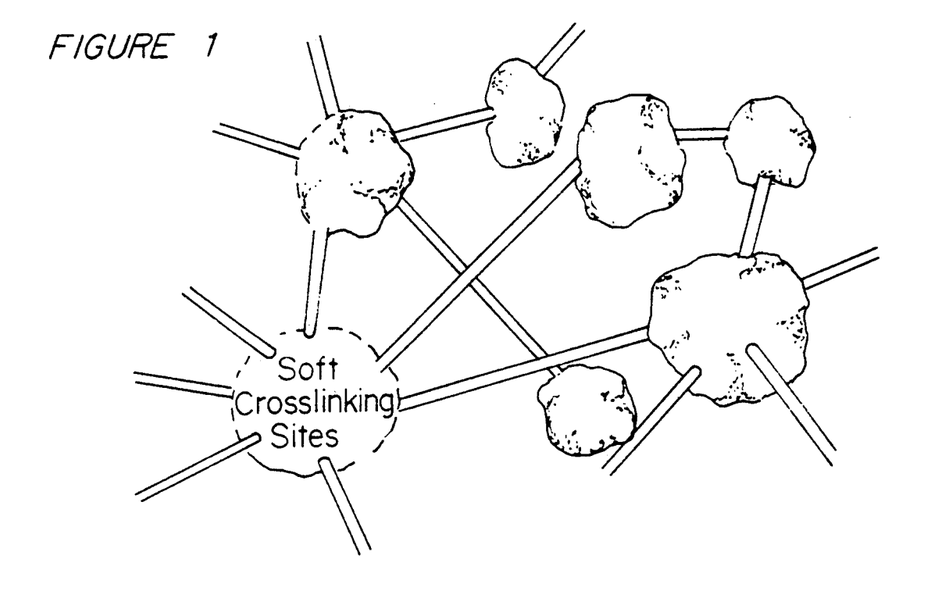
FIG. 1 is a schematic of the macromolecular architecture resulting from the polymerization of rigid monomer in the presence of soft, polymeric crosslinking sites

A schematic of the product is illustrated in FIG. 1. The polymeric rigid members (struts) are joined on both ends by soft, polymeric multifunctional crosslinking sites (soft joints) FIG. 1 is most representative of a system wherein the hard monomer forms linear and stiff members. The invention as disclosed also includes macromolecular networks yielding hard plastics wherein the rigid framework is articulated, branched, or random coiling. Liquid crystal (rigid-rod) polymers can be used as the stiff segments. Liquid crystal struts with artificial molecular bends are articulated. High glass transition amorphous polymers are generally random coiling.

Figure 2:
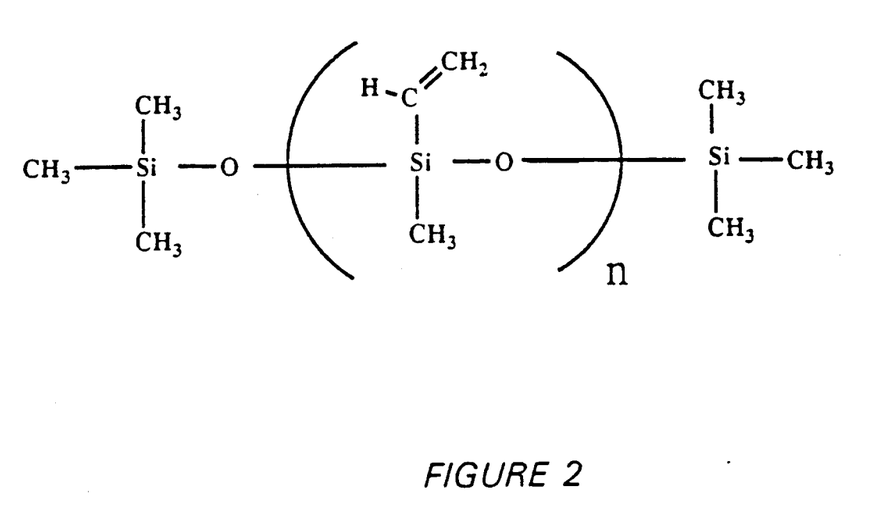
FIG. 2 is an illustration of the chemical structure of polyvinylmethylsiloxane (PVMS).

FIG. 2 is an illustration of the chemical structure of polyvinylmethylsiloxane.

Figure 3:
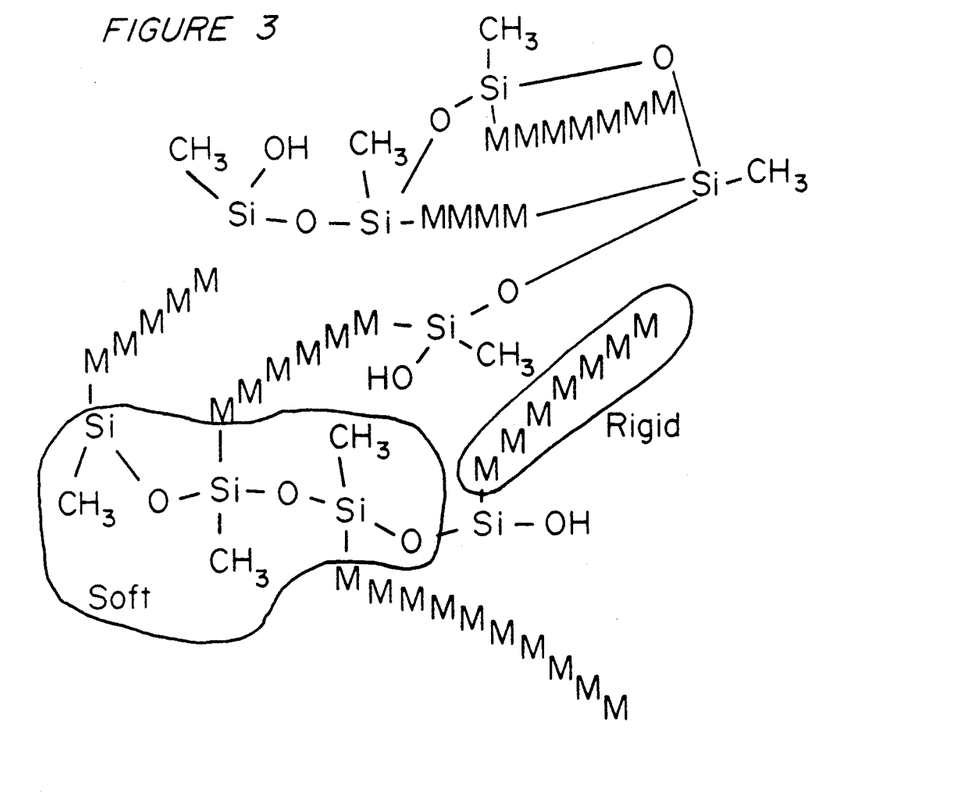
FIG. 3 is a schematic of the crosslinked supernetwork formed by the polymerization of methylmethacrylate in the presence of polyvinylmethylsiloxane.

FIG. 3 is a schematic of the crosslinked supernetwork formed by the polymerization of methylmethacrylate in the presence of polyvinylmethylsiloxane.

In general, transparency of a clear material is affected when a heterogeneous material is introduced that has a size comparable to or greater than the wavelength of light. Since the crosslinking sites are molecular in dimension in the macromolecular network described herein, there is no light scattering and therefore no adverse effect on the transparency of the material. As long as the crosslinking molecules do not self aggregate to dimensions comparable to a wavelength of light, sample transparency is guaranteed.

The hard and soft segments can be random, alternating, block, or graft in their sequence distribution and spatial arrangement. Random, or alternating, copolymers are generally single-phased, and thus transparent in their pure form except for possible optical absorption bands. Block and graft copolymers are generally multi-phased, and the phase-separated domain size must be made small in order for the material to retain transparency. In all cases, the ultimate mechanical properties represent a compromise. The polymeric supernetwork described herein combines the best of mechanical and optical properties.

DESCRIPTION OF RIGID FRAMEWORK

Hard monomers or hard materials are chosen for the rigid framework portion of the macromolecular network that, once polymerized, give rigid transparent plastics with a glass transition temperature above the temperature of use (typically ambient temperatures) and with good optical properties. The monomer is in general one that polymerizes through a chain mechanism, such as an alkene derivative. A preferred monomer is methylmethacrylate. Other alkene derivatives include other alkyl methacrylates, alkylacrylates, allyl or aryl acrylates and methacrylates, cyanoacrylate, styrene, α-methyl styrene, vinyl esters, including vinyl acetate, vinyl chloride, methyl vinyl ketone, vinylidene chloride, acrylamide, methacrylamide, acrylonitrile, methacrylonitrile, acrylic acid and methacrylic acids. Mixtures of monomers can also be used in the polymerization process.

Partially halogenated or perhalogenated hard monomers, including fluorine containing monomers, can also be used in the rigid framework, including but not limited to fluorine containing methacrylates and acrylates, such as $C_1$ to $C_7$ partially fluorinated esters of methacrylic or acrylic acid, for example, 2,2,2-trifluoroethyl methacrylate, trifluoromethyl methacrylate, 2,2,2,3,4,4,4-heptafluorobutyl methacrylate, and 2,2,2,2',2',2'-hexafluoroisobutyl methacrylate.

Acrylate-terminated or otherwise unsaturated urethanes, carbonates, and epoxies can also be used in the rigid framework. An example of an unsaturated carbonate is allyl diglycol carbonate (CR-39). Unsaturated epoxies include, but are not limited to, glycidyl acrylate, glycidyl methacrylate, allyl glycidyl ether, and 1,2-epoxy-3-allyl propane.

Bisphenol-A-bis-2-hydroxypropylmethacrylate, and bisphenol-A-bis-2-hydroxypropylacrylate can also be used as hard monomers.

Preformed polymers that have ethylenically unsaturated groups can also be made more impact resistant by the methods described herein. Acrylate-terminated novolacs can be used as or in the rigid framework of the polymeric macromolecular network. Polyurethanes, polymeric epoxies, and polycarbonates that have been derivatized to include acrylate, methacrylate, or other unsaturated functional groups are well known and commercially available. Examples of commercially available photocurable materials are the line of Synocure products sold by Cray Valley Products (for example, Synocure 3101, a diacrylate derivative of bisphenol-A, and Synocure 3134, an aliphatic urethane diacrylate), and the Epon products sold by Shell Corporation (for example, Epon 1001 and Epon 828, which are both diacrylates of the diglycidyl ether of bisphenol-A). Vinyl-terminated liquid crystalline polymers can also be used.

Poly(carbonyldioxy-1,4-phenyleneisopropylidene-1,4-phenylene) is sold under the trade names Lexan, Makrolon, and Merlon. This polycarbonate has good mechanical properties over a wide temperature range, good impact and creep resistance, high transparency, and good dimensional stability. Unsaturated derivatives of this polymer, such as the allyl or acrylate derivatives of poly(carbonyldioxy-I,4-phenyleneisopropylidene-1,4-phenylene) can be made more impact resistant by reacting the polymer with a soft moiety as described herein.

Optical grade epoxies with terminal unsaturation include those made from 1,2-propylene oxide, 1,2-butylene oxide, 1,2-epoxydecane, 1,2-epoxyoctane, 2,3-epoxynorbornane, 1,2-epoxy-3-ethoxypropane, 1,2-epoxy-3-phenoxypropane, oxetane, 1,2-epoxy-5-hexene-1,2-epoxyethylbenzene, 1,2-epoxy-1-methoxy-2methylpropane, perfluorohexylethoxypropylene oxide, benzyloxypropylene oxide, and mixtures of these.

Mixtures of hard monomers can be used in the preparation of the macromolecular network. For example, methylmethacrylate can be polymerized in combination with alkylacrylate or arylacrylate, such as methylacrylate or ethylacrylate.

The hard monomers can be mixed in any desired ratio, as long as the components remain compatible and miscible. Acrylates can be mixed with methacrylates over the entire composition range. Acrylates generally polymerize more rapidly than methacrylates using either photochemical or thermal initiation.

Additionally, preformed polymers with terminal or internal unsaturation can be copolymerized with hard monomers in the presence of a soft moiety with ethylenic unsaturation, to form a material with high impact resistance.

In an alternative embodiment, inert polymers can be added to the starting mixture, to thicken the mixture, for ease of handling, to reduce the total reaction time, or for other reasons. The inert polymeric material can be any polymer, and can be used in any amount, that does not adversely affect the desired properties of the final material. Inert polymers in general are polymers that do not react with other components in the reaction solution. In one embodiment, an inert polymer of the hard monomer or hard material is added to the polymerization solution. For example, if methyl methacrylate is used as the hard monomer in the macromolecular network, polymethylmethacrylate can be added to the polymerization solution.

DESCRIPTION OF SOFT JOINTS

A polymer or oligomer should be chosen for use as the soft joints of the macromolecule that has a low glass transition temperature (ranging from below room temperature to as low as obtainable), that provides a soft, pliable material when homopolymerized, is stable to high and low temperatures, and is compatible with and soluble in the copolymerizing agent. If it is desired that the macromolecular network have optical transparency, the polymer or oligomer used for the soft joints must be of a size that does not scatter light, and therefore is less than approximately 100 nanometers, and optimally, no larger than approximately 10 nanometers.

Examples of suitable polymers for the soft joints include vinyl substituted siloxanes, allyl substituted siloxanes, acrylate terminated or substituted siloxanes, and partially or perfluorinated derivatives of vinyl substituted siloxanes, allyl substituted siloxanes, or acrylate terminated or substituted siloxanes. For example, polydimethylsiloxane has a glass transition temperature of −123° C., Which is the lowest known polymeric glass transition temperature. When one of the two methyl groups attached to the silicon atom is replaced with a vinyl group, a reactive, multifunctional polymer, polyvinylmethylsiloxane (PVMS, see FIG. 2) is produced. This polymer is soft and can copolymerize with a variety of monomers through well-established free radical chemistry. The Si-O bonds are quite flexible and provide a cushion effect on impact. Polyvinylperfluoromethylsiloxane can also be used as the soft joint material.

Hydrocarbon polyunsaturated (multi-functional) compounds (both homo- and copolymers, and especially oligomers) can also be used as the soft joints in the macromolecular network. Hydrocarbon unsaturated compounds can be produced, among other ways, by the polymerization of conjugated dienes such as butadiene, isoprene, and chloroprene. Two different types of polymerization reactions occur with 1,3-dienes. One type involves the polymerization of one or the other of the double bonds in a typical chain polymerization In a second pathway, the two double bonds act in concert to yield an allylic radical that can react with a successsive monomer at either carbon 2 or carbon 4 (1,2-polymerization and 1,4-polymerization, respectively). The 1,2-polymer has pendant unsaturation, whereas the 1,4-polymer has unsaturation in the polymer backbone. All of these various types of polymerization products of conjugated dienes can be used to prepare the polymeric network described herein.

To ensure optical transparency while using a finite amount of soft segments, molecular compatibility is critical. Compatibility is usually optimized by using low molecular weight soft moieties.

End Chain Tethers

The macromolecular network prepared as described above can be crosslinked by including a small difunctional or multifunctional reactive molecule, or mixture of small di- or multifunctional molecules.

Crosslinking agents for hard monomers that are polymerized by a chain process are known to those skilled in the art, and include tri- or tetrafunctional acrylates or methacrylates, alkylene glycol and polyalkylene glycol diacrylates and methacrylates, including ethylene glycol dimethacrylate and ethylene glycol diacrylate, vinyl or allyl acrylates or methacrylates, divinylbenzene, diallyldiglycol dicarbonate, diallyl maleate, diallyl fumarate, diallyl itaconate, vinyl esters such as divinyl oxalate, divinyl malonate, diallyl succinate, triallyl isocyanurate, the dimethacrylates or diacrylates of bis-phenol A or ethoxylated bis-phenol A, methylene or polymethylene bisacrylamide or bismethacrylamide, including hexamethylene bisacrylamide or hexamethylene bismethacrylamide, di(alkene) tertiary amines, trimethylol propane triacrylate, pentaerythritol tetraacrylate, divinyl ether, divinyl sulfone, diallyl phthalate, triallyl melamine, 2-isocyanatoethyl methacrylate, 2-isocyanatoethylacrylate, 3-isocyanatopropylacrylate, 1-methyl-2-isocyanatoethyl methacrylate, and 1,1-dimethyl-2-isocyanaotoethyl acrylate.

The crosslinking agent is added to the hard monomers or polymers and soft joints prior to the initial prepolymerization step. The amount of crosslinking agent added will determine how tightly crosslinked the final network is. The crosslinking agent can be used in any amount that produces the desired results. It is typically added in an amount ranging from 0.1% to less than 10% by weight.

Preparation of the Network

To prepare a macromolecular network in which the soft joints are homogeneously dispersed throughout the polymer, it is important that the hard monomer and the soft component be continuously and efficiently stirred during the initial stages of polymerization. If the soft component and the rigid component are simply mixed and left to polymerize in a static, quiescent cavity, the two components will tend to phase separate during polymerization. Phase separation before polymerization causes hazy or opaque products. In addition, the two components typically have different densities. If left alone in a quiescent cavity for a long time, the heavier component will migrate to the bottom, and on polymerization, a product will be produced that has a composition gradient in the direction of the gravitational field. When polyvinylmethylsiloxane and methylmethacrylate are combined, the PVMS collects near the bottom of the container. Polymerization of this stratified mixture produces a product that has a softer lower portion topped by a rigid upper portion.

In a preferred embodiment, in a first stage of polymerization, the two components in any desired ratio are continuously stirred while polymerization is initiated. Inert polymer can be included in the polymerization mixture as desired, to thicken the reaction mixture, to reduce the reaction time, or for other reasons. This prepolymerization step can be accomplished in an open vessel such as a beaker, exposed to the atmosphere, or preferably, under an inert gas such as $N_2$. Polymerization is allowed to proceed with continuous stirring until an incipient copolymer and partial network is formed. The viscosity of the partially-polymerized reaction solution increases to the point that phase separation and stratification does not occur when the solution is poured and then left undisturbed for a long time. The partial polymerization step that includes stirring during the early stages of polymerization before final mold filling and completion of polymerization, ensures that phase separation and sedimentation are totally suppressed, either by virtue of the slow kinetics, or for thermodynamic reasons since the incipient copolymer are structurally similar and uniform everywhere in the sample.

In the second stage of polymerization, the partially-polymerized material is poured into the final static and quiescent mold cavity, for example, a mold lens, to form the final object, that should be clear, transparent, and without composition gradient. The requirements of exact dimensions, shape, and curvature preclude injection, transfer, or compression molding. The resulting material may or may not be tightly attached to one or both sides of the mold, depending on whether a laminate or a pure plastic product is desired.

As an example, under intense UV irradiation, mixtures with from approximately 90% methylmethacrylate and 10% polyvinylmethylsiloxane (weight average molecular weight ranging from 300 to an upper limit that is low enough to ensure optical transparency), up to virtually all methylmethacrylate, with a trace of PVMS provide a transparent plastic with improved fracture resistance. The more PVMS used, the greater the improvement of fracture resistance. When a 90% methylmethacrylate and 10% polyvinylmethylsiloxane plastic network prepared as described in Example 1 is projected with great velocity against a hard concrete surface, the material recoils a large distance without shatter, chipping, or fracture. Even a 1 millimeter sheet prepared from 90% methylmethacrylate and 10% polyvinylmethylsiloxane surpasses by a wide margin the U.S. Food and Drug Administration's requirement for impact resistance for ophthalmic lenses (the standard drop-ball test).

The copolymerization of hard and soft monomers give final materials with intermediate properties, depending on their composition. A compromise is generally reached when the product polymer is neither extremely rigid nor unnecessarily soft.

Any ratio of components can be used in the macromolecular network that produces the desired results. The prepolymerization step and the final polymerization can be accomplished at any temperature that produces the desired product, and typically ranges from ambient temperature to the boiling point of the lowest boiling component. The prepolymerization step typically takes from approximately a few minutes to a few hours. Optical clarity can be maximized by insuring vigorous agitation, minimizing trapped air during agitation, and by allowing the prepolymerization step to proceed to the point that the soft joints are homogeneously and permanently distributed throughout the partially polymerized network.

The completion of polymerization is preferably carried out in an inert atmosphere if done in an open mold and free radical reactions are occurring. It is known that oxygen inhibits free radical polymerization, and gives rise to extended polymerization times. If closed molds are used to form the article, the mold should be made from an inert material that has non sticking properties such as poly(tetrafluoroethylene), silicone rubber, polyethylene, polypropylene, and polyester. Glass and metallic molds can be used if a suitable mold-releasing agent is used. If it is desired to use the high impact plastic material as a laminate, the mold may actually be comprised of, or may include, the material to which the laminate is attached.

This final step of polymerization can be carried out in a method to prevent cavitation, or voids caused by the shrinkage of material during polymerization, using the sequential polymerization process and apparatus disclosed in U.S. Pat. No. 5,071,531, entitled "Casting of Gradient Gels," incorporated herein by reference in its entirety. Briefly, the partially polymerized material is inserted between two mold halves, one of which is constructed of a material that transmits energy, either thermal or UV. Stress related voids in the polymeric material can be eliminated by causing the partially polymerized material to polymerize in a differential fashion along a moving front, so that the material ahead of the moving polymer zone remains liquid, and the material that the front has passed is gelled. The still-liquid material ahead of the moving polymer zone can then flow freely, at a rate that equals the rate of shrinkage, and a void-free, reduced stress polymeric network is produced.

Any UV or thermal free radical initiator known to those skilled in the art for free radical polymerization can be used to initiate this process. Examples of UV and thermal initiators include benzoyl peroxide, acetyl peroxide, lauryl peroxide, azobisisobutyronitrile, t-butyl peracetate, cumyl peroxide, t-butyl peroxide, t-butyl hydroperoxide, bis(isopropyl)peroxydicarbonate, benzoin methyl ether, 2,2'-azobis(2,4-dimethylvaleronitrile), tertiarybutyl peroctoate, phthalic peroxide, diethoxyacetophenone, and tertiarybutyl peroxypivalate, diethoxyacetophenone, I-hydroxycyclohexyl phenyl ketone, 2,2-dimethyoxy-2-phenyl-acetophenone, and phenothiazine, diisopropylxanthogen disulfide. An example of a commercial product that provides non-yellowing products is Irgacure 184 (sold by Ciba Geigy Corporation, 1-hydroxycyclohexyl phenylketone).

Any amount of initiator can be used that produces the desired product. Typically, the amount of initiator varies from 0.1% to 5%, by weight of hard monomer, and is preferably in the range of 0.5% to 3%.

Example 1: Preparation of Macromolecular Network of Methylmethacrylate and Polyvinylmethylsiloxane Methylmethacrylate (94% by weight), polyvinylmethylsiloxane (5% by weight, $M_w$ 300–500), and 1% UV photoinitiator (Irgacure) were mixed under UV light (300–400 nm) while stirring to provide strong agitation, until the mixture reached a consistency of that of honey or molasses. The solution was poured into a closed lens mold, and polymerization carried out sequentially as described in U.S. Pat. No. 5,071,531 with UV light to provide a clear, transparent material that is highly shatter resistant.

The refractive index of the material prepared as in Example 1 is relatively high (approximately 1.492), and falls between common hydrocarbon polymers and inorganic glass.

Example 2: Preparation of Macromolecular Network from Methylmethacrylate, Styrene, Divinylbenzene, and Polyvinylmethylsiloxane Methylmethacrylate (90% by weight), styrene (5% by weight), divinylbenzene (0.5%) and polyvinylmethylsiloxane (3% by weight), and 1.5% UV photoinitiator (cyclohexylbenzoin) are mixed under UV light (300–400 nm) with strong agitation, until the mixture reaches a consistency of that of honey or molasses. The solution is poured into a closed lens mold, and polymerization carried out sequentially as described in U.S. Pat. No. 5,071,531 with UV light to provide a clear, transparent material that is highly shatter resistant.

After precision in-situ polymerization, the exposed surface can readily be modified by an oxygen plasma (glow discharge) to make it more scratch-resistant, as described in Example 3.

Example 3: Transformation of Macromolecular Network to Scratch-Resistant Glass

The transparent, rigid, high impact material prepared in Example 1 is made more scratch resistant by exposing the surface to parallel electrodes or porous barrel electrodes that are powered by an ac-generator operating at 13.6 MHz (band allowed by FCC) in a vacuum chamber. In the chamber a discharge forms by the decomposition of oxygen molecules at low pressure (e.g., 1 mm Hg) driven by the field. The sample surface is modified by such oxygen plasma. Hydrocarbon is ablated and siloxane is converted to silicate (glass). Therefore, a scratch-resistant surface emerges wherein the chemical constitution is essentially that of inorganic glass. The thickness of the surface layer is generally very shallow, being on the order of 100 Å.

Example 4: Preparation of High Impact Polycarbonate

Allyldiglycol carbonate (CR-39) is stripped of its inhibitors by passing the liquid monomer through an absorption bed (basic alumina). It is then mixed with PVMS in a ratio of 90% carbonate to 10% PVMS by weight. The material is then polymerized as described in Example 1.

Example 5: Preparation of High Impact Optical Grade Epoxy

Synocure 3101 (95% by weight) is mixed with 4.5% by weight of polybutadiene, and 0.5% initiator, and polymerized as described in Example 1.

Example 6: Preparation of Macromolecular Network of Methylmethacrylate, Methylacrylate and Polyvinylmethylsiloxane Methylmethacrylate (42.5% by weight), and methylacrylate (42.5% by weight) were mixed, and polyvinylmethylsiloxane (4% by weight, $M_W$ 300–500), and 1% UV photoinitiator (Irgacure) were mixed under UV light (300–400 nm) while stirring to provide strong agitation, until the mixture reached a consistency of that of honey or molasses. The solution was poured into a closed lens mold, and polymerization carried out sequentially as described in U.S. Pat. No. 5,071,531 with UV light to provide a clear, transparent material that is highly shatter resistant.

EXAMPLE 7: Preparation of Macromolecular Network of Methylmethacrylate and Polyvinylmethylsiloxane, With Ethylglycol Dimethacrylate as Crosslinking Agent Methylmethacrylate (92% by weight), polyvinylmethylsiloxane (5% by weight), ethylglycol dimethacrylate (I% by weight) and (2%) UV photoinitiator (Irgacure) are mixed, and then reacted under UV light with strong agitation, until the mixture reached a consistency of that of honey or molasses. The solution is poured into a closed lens mold, and polymerization carried out sequentially as described in U.S. Pat. No. 5,071,531 with UV light to provide a clear, transparent material that is highly shatter resistant.

Example 8: Comparison of the Physical Properties of Traditional Polycarbonates with a High Impact Resistant Polymer The density, refractive index, Abbe number, flexural modulus, CTE (Coefficient of Thermal Expansion), glass transition temperature and percent visual transmission of a macromolecular network prepared as in Example 1 (referred to as S-5) were compared to a polycarbonate thermoplastic (Lexan), and a polycarbonate thermoset prepared from allyldiglycol carbonate (CR 39) obtained from PPG Industries. The results are provided in Table 1. The S-5 material exhibited a higher impact resistance than both the thermoplastic and the thermoset polycarbonate, while retaining good optical transmission, a high refractive index, and rigidity.

This invention has been described with reference to its preferred embodiments. Variations and modifications of the invention described herein will be obvious to those skilled in the art from the foregoing detailed description of the invention. It is intended that all of these variations and modifications be included within the scope of the appended claims.

TABLE 1

| Optical and Mechanical Properties of Selected Plastic | | | |
|---|---|---|---|
| Type | Polycarbonate Thermoplastic | CR-39 Thermoset | S5 Thermoset |
| Density | 1.19 | 1.31 | 1.18 |
| Refractive Index | 1.59 | 1.49 | ~1.5 |
| Abbe Number | 26 | 59 | ~58 |
| Flexural Modulus (dynes/cm2) | $2.4 \times 10^9$ | $2 \times 10^{10}$ | $5 \times 10^9$ |
| CTE (ppm/°C.) | 62 | 81–114 | less than 90 |
| Tg (°C.) | 150 | 85 | ~70 |
| % Vis Transmission (400–800 nm) | 90 | 93 | 91 |

I claim:

1. A macromolecular network with high impact resistance prepared by:
    (i) polymerizing or copolymerizing with vigorous agitation, an unsaturated hard material characterized in that when homopolymerized, it forms a polymeric material that is below its glass transition temperature at ambient temperature,
    in the presence of a polymeric or oligomeric soft moiety of less than approximately 100 nanometers of vinyl substituted polysiloxane or allyl substituted polysiloxane, to form a partially polymerized mixture in which the soft moiety is homogeneously distributed;
    (ii) pouring the partially polymerized mixture into a mold; and then
    (iii) completing the polymerization without agitation.

2. The macromolecular network of claim 1 wherein the hard material comprises a hard monomer selected from the group consisting of alkyl methacrylate, alkyl acrylate, allyl or aryl acrylate or methacrylate, glycidyl acrylte, and glycidyl methacrylate.

3. The macromolecular network of claim 2, wherein the hard monomer is methylmethacrylate.

4. The macromolecular network of claim 1, wherein the soft moiety is polyvinylmethylsiloxane.

5. The macromolecular network of claim 1, wherein the hard material comprises a halogen containing monomer.

6. The marromolecular network of claim 1, wherein the polymerization is initiated with a free radical initiator in the presence of heat or ultraviolet light.

7. The macromolecular network of claim 1, further comprising including a crosslinking agent in the polymerization process.

8. The macromolecular network of claim 7, wherein the crosslinking agent is selected from the group consisting of tri- or tetrafunctional acrylates or methacrylates, alkylene glycol and polyalkylene glycol diacrylates and methacrylates, including ethylene glycol dimethacrylate and ethylene glycol diacrylate, vinyl or allyl acrylates or methacrylates, divinylbenzene, diallyldigylcol dicarbonate, diallyl maleate, diallyl fumarate, diallyl itaconate, vinyl esters such as divinyl oxalate, divinyl malonate, diallyl succinate, triallyl isocyanurate, the dimethacrylates or diacrylates of bis-phenol A or ethoxylated bix-phenol A, methylene or polymethylene bisacrylamide or bismethacrylamide, including hexamethylene bisacrylamide or hexamethylene bismethacrylamide, di(alkene) tertiary amines, trimethylol propane triacrylate, pentaerythritol tetraacrylate, divinyl ether, divinyl sulfone, diallyl phthalate, triallyl melamine, 2-isocyanatoethyl methacrylate, 2-isocyanatoethylacrylate, 3-isocyanatopropylacrylate, 1-methyl-2-isocyanatoethyl methacrylate, and 1,1-dimethyl-2-ioscyanaotoethyl acrylate.

9. The macromolecular network of claim 1, wherein an inert polymer is included in step (i).

* * * * *